Figure 1A:
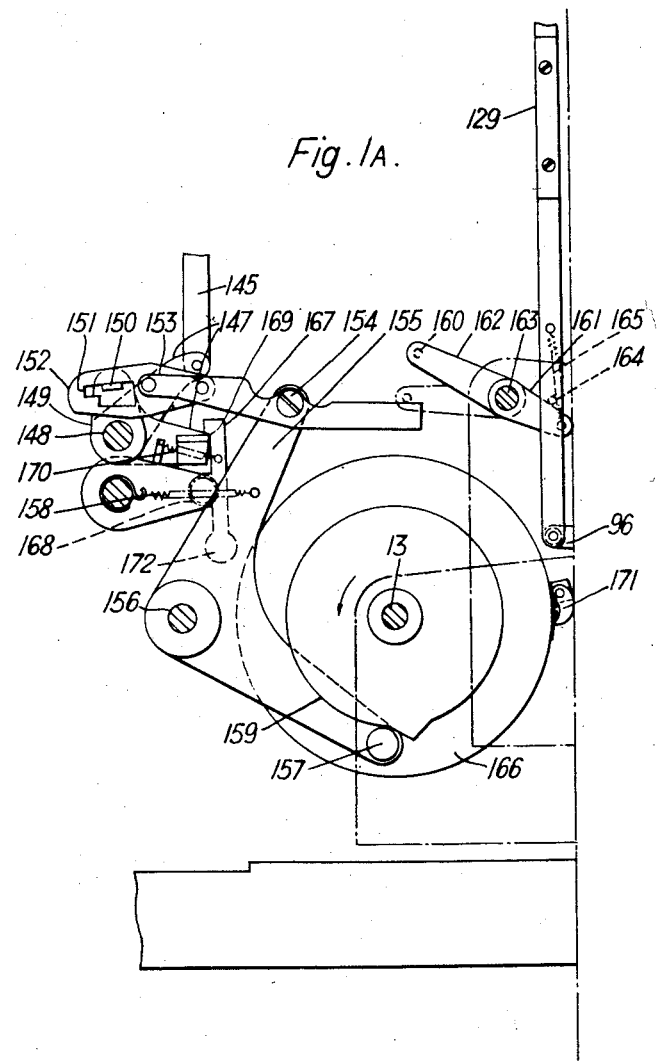

March 5, 1957 R. G. WILDY 2,783,943
RECORD CARD CONTROLLED ADDING MACHINES
Filed Jan. 11, 1956 8 Sheets-Sheet 1

Inventor
RONALD G. WILDY
By

March 5, 1957 R. G. WILDY 2,783,943
RECORD CARD CONTROLLED ADDING MACHINES
Filed Jan. 11, 1956 8 Sheets-Sheet 2

Inventor
RONALD G. WILDY
By

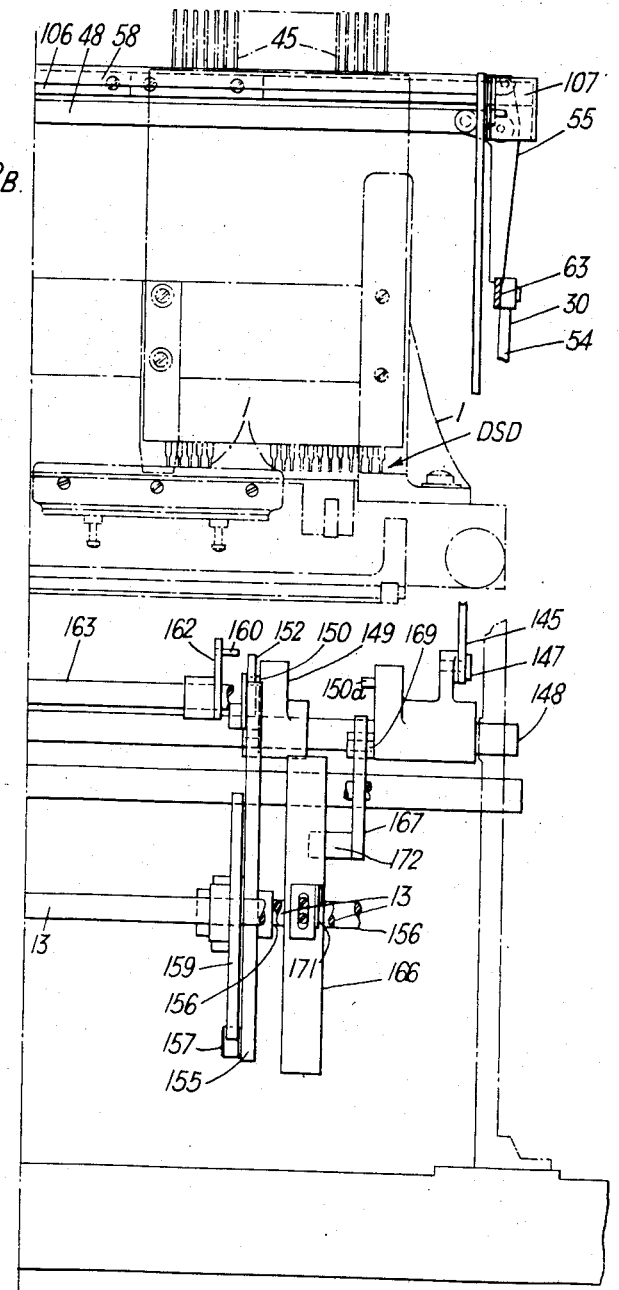

March 5, 1957 R. G. WILDY 2,783,943
RECORD CARD CONTROLLED ADDING MACHINES
Filed Jan. 11, 1956 8 Sheets-Sheet 6

Inventor
RONALD G. WILDY
By
Attorney

March 5, 1957 R. G. WILDY 2,783,943
RECORD CARD CONTROLLED ADDING MACHINES
Filed Jan. 11, 1956 8 Sheets-Sheet 7
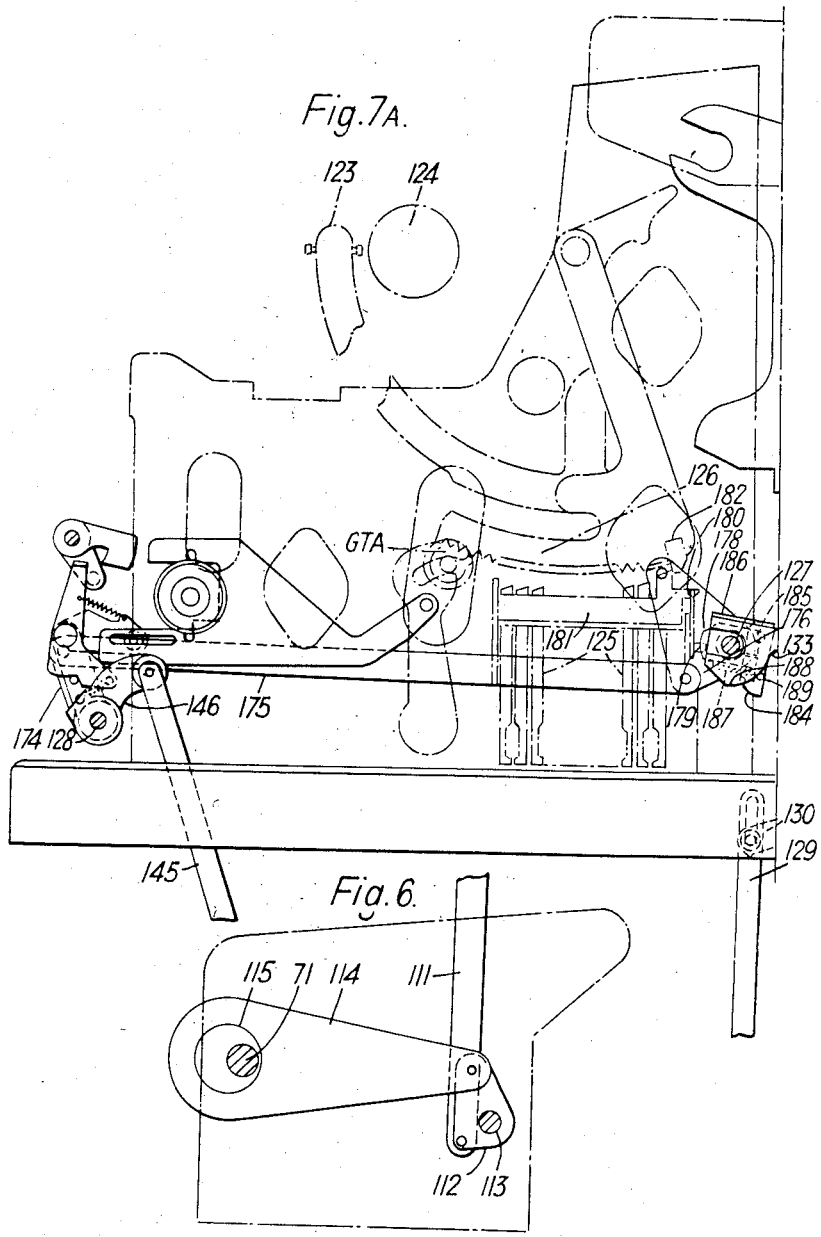
Inventor
Ronald G. Wildy
By March 5, 1957 R. G. WILDY 2,783,943
RECORD CARD CONTROLLED ADDING MACHINES
Filed Jan. 11, 1956 8 Sheets-Sheet 8
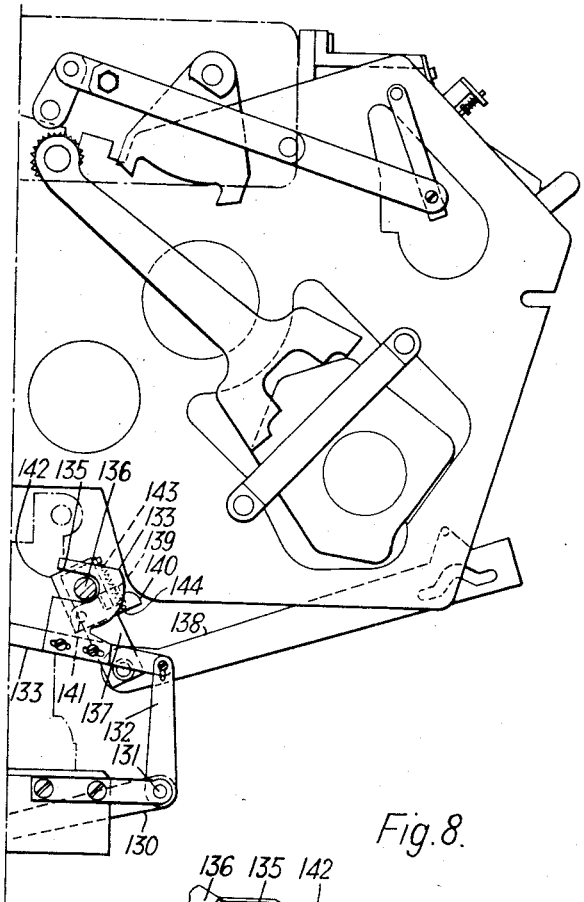
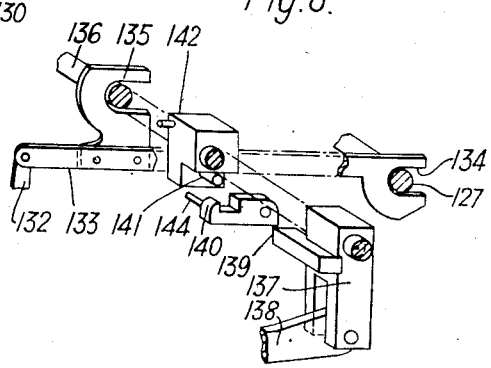
Inventor
RONALD G. WILDY
By

United States Patent Office 2,783,943
Patented Mar. 5, 1957

2,783,943

RECORD CARD CONTROLLED ADDING MACHINES

Ronald Gordon Wildy, Addiscombe, Croydon, England, assignor to Powers-Samas Accounting Machines Limited, London, England, a British company Application January 11, 1956, Serial No. 558,525

27 Claims. (Cl. 235—61.9)

This invention relates to record card controlled adding machines, for example as tabulating machines.

As is well understood in the art, record card controlled adding machines include an adding unit or accumulator in which amounts sensed from record cards are registered and the machines usually also incorporate printing mechanism which effects a printed record of each amount entered into the accumulator and, during a total-taking operation, of the total which is registered in the accumulator. Some machines, such for example as tabulators, include a sub-total adding unit or accumulator and a grand-total adding unit or accumulator to which latter, during a sub-total-taking operation of the machine, is transferred the amount registered in the sub-total accumulator, that is the accumulator which receives the individual amounts sensed from the cards.

The cards which are to be used in the machine have applied thereto, for example by means of perforations or marks, two kinds of information or data, namely designation data and item data which latter includes the amounts to be sensed from the cards for registration in an accumulator. The designation data, which may indicate a customer's name or identification number, is sensed separately from and before the item data, although it may be again sensed together with the item data, and is used to control total-taking operations of the machine. Thus a pack of cards placed into a magazine at the input end of the machine may include a number of groups of cards, the different groups containing cards of differing designation but the cards of each individual group all being of like designation. When the cards are fed into the machine item amounts sensed from a group of cards of like designation are entered into an accumulator and when the designation data of the first card of the next succeeding group is sensed there is initiated a total-taking opration of the machine during which the accumulator is cleared or zeroised ready to receive the item amounts sensed from the next succeeding group of cards.

Usually, a total-taking operation of the machine entails an interruption of the normal running of the machine because whereas the normal adding operations require only one machine cycle each, that is one revolution of the main shaft of the machine, a total-taking operation requires more than one cycle and usually not less than three cycles. It often happens, however, that a card group consists only of a single card and when this has occurred in machines employed prior to the present invention each single-card group has initiated a normal total-taking operation employing the usual number of machine cycles, the amount sensed from each single-card group being entered into the accumulator and cleared therefrom. This has involved loss of machine operating time, and undesirable wear on the machine, particularly in instances where there occurs a succession of single-card groups, and may when printing mechanism is incorporated in the machine result in ambiguity of printing because the amount sensed from each single-card group will be printed both as an item and as a total.

It is a main object of the present invention to provide a record card controlled adding machine with means whereby when a batch of cards fed to the machine includes one or more single-card groups no single-card group initiates a normal total-taking operation of the machine thereby effecting a saving of machine operating time.

It is also an object of the invention to provide in a record card controlled adding machine embodying a sub-total adding unit or accumulator and a grand-total adding unit or accumulator means whereby an amount sensed from a card forming a single-card group, instead of being entered into the sub-total adding unit or accumulator and transferred therefrom to the grand-total adding unit or accumulator, is entered directly into the grand-total adding unit or accumulator thus leaving the sub-total unit in the zeroised condition thereof in preparation to receive two or more amounts sensed from two or more successive cards of like designation.

According to the present invention a record card controlled adding machine comprising normally inactive total-taking mechanism, a designation sensing device operative to sense changes of designation of cards fed in succession thereto, and control mechanism operative by the designation sensing device on sensing thereby of a change of designation to render active the total-taking mechanism, is characterized by a normally inactive interrupter device to render said control mechanism ineffective to effect activation of the total-taking mechanism and a normally inactive delay device rendered active by an operation of the total-taking mechanism to effect actuation of the interrupter device and to maintain the interrupter device in the actuated condition thereof until determination by the designation sensing device of the feeding thereto of two successive cards of like designation.

Figure 1B:
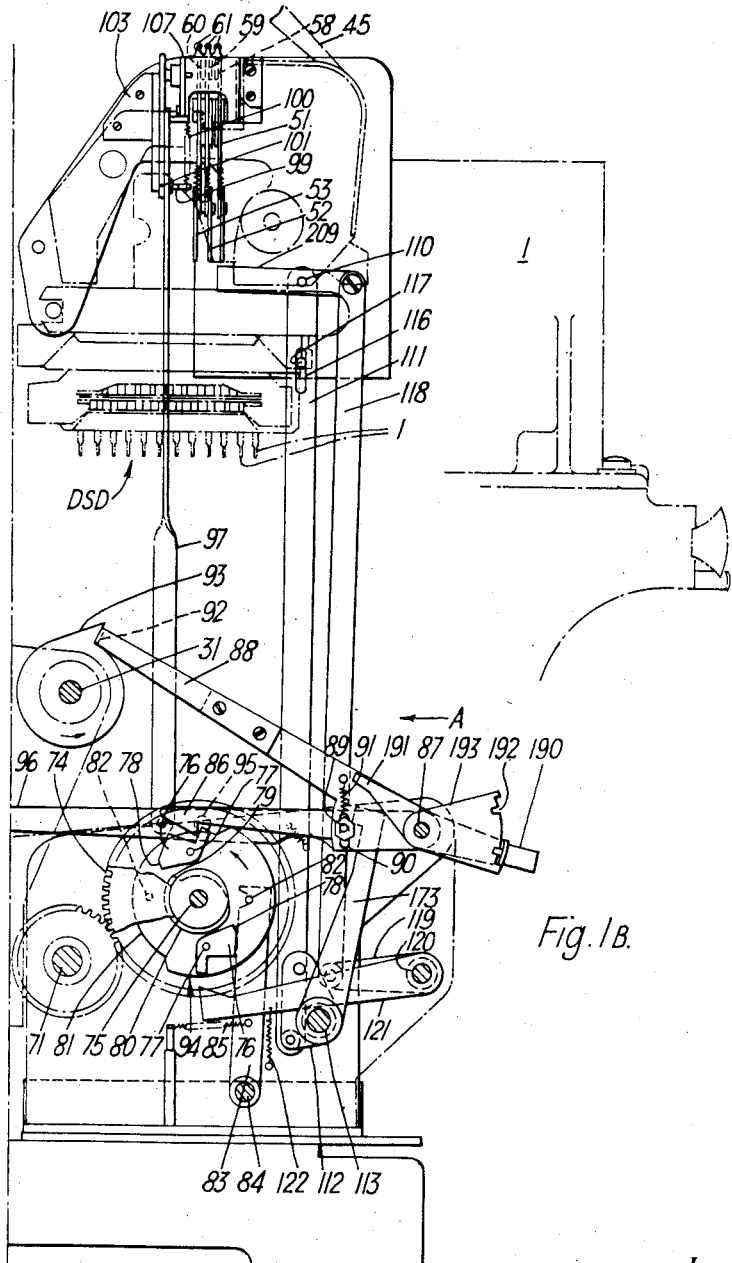
Figure 2A:
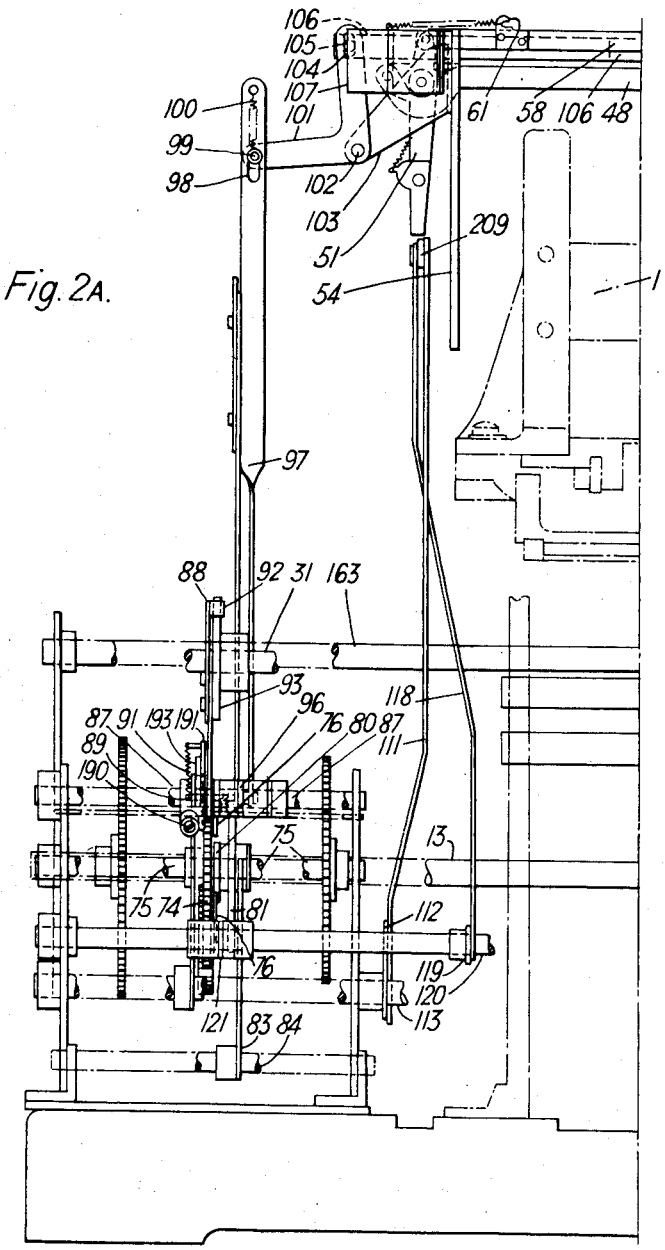
Figure 3:
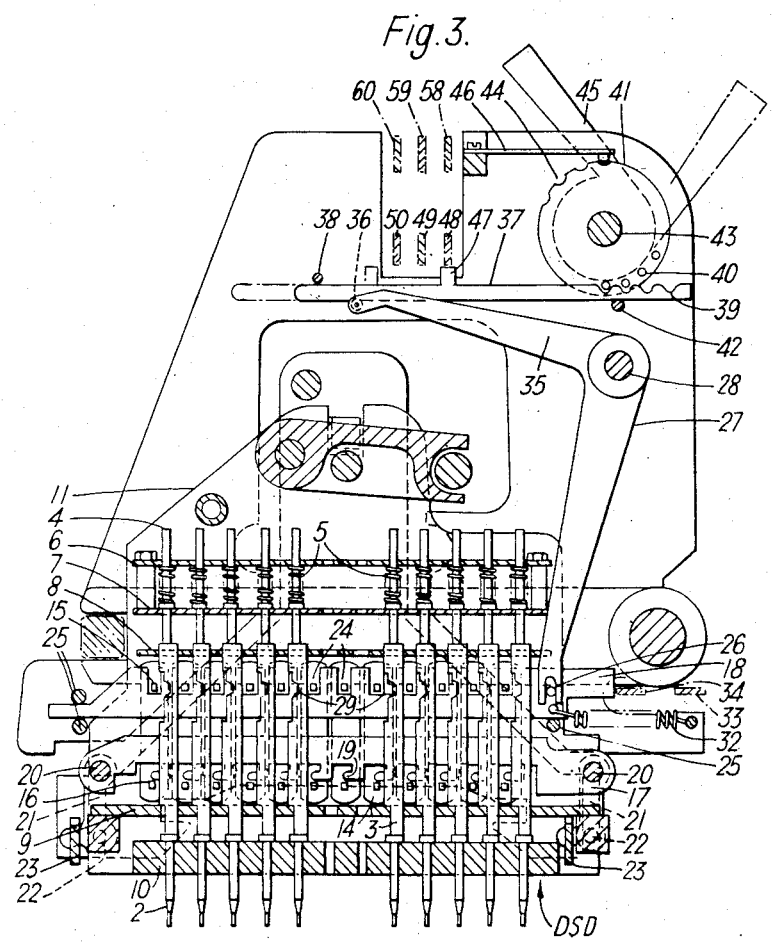
Figure 4:
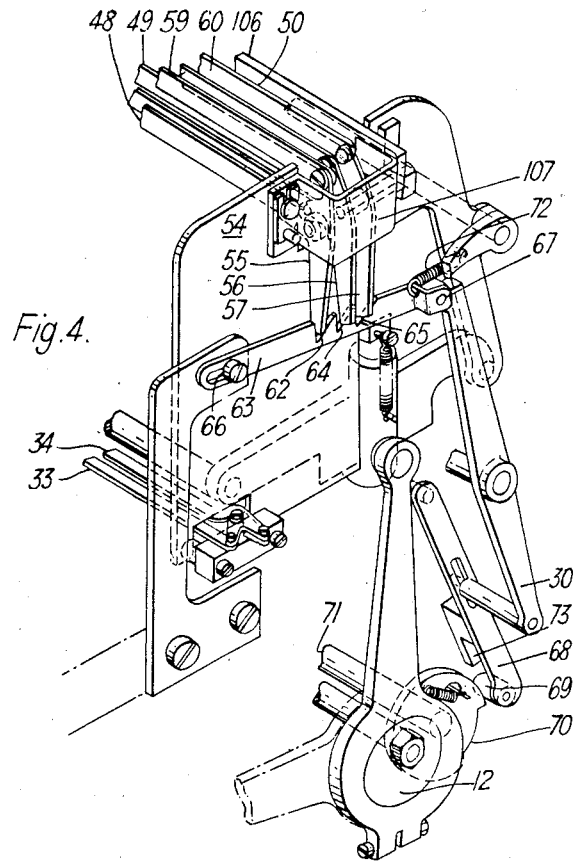
Figure 5:
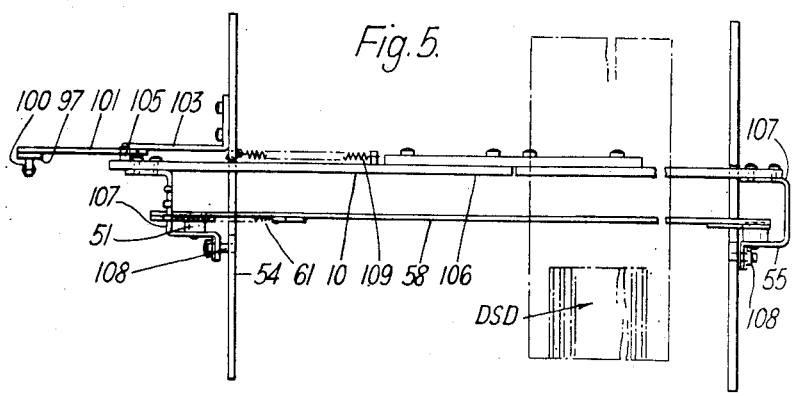

In order that the invention may be clearly understood one embodiment thereof will now be described, by way of example, with reference to the accompanying diagrammatic drawings, in which:

Figures 1A and 1B together are an end elevation of a part of the base of a tabulating machine having apparatus according to the invention applied thereto, Figures 2A and 2B together are a view looking in the direction of arrow "A," Figure 1B, Figure 3 illustrates in cross-section the designation sensing device embodied in the machine, Figure 4 is a pictorial view of one end of the designation sensing device, Figure 5 is a top plan of a part of the mechanism shown in Figures 2A and 2B, Figure 6 illustrates a detail of the apparatus, Figures 7A and 7B together illustrate a part of the head of the tabulator, and Figure 8 is an exploded pictorial view of a detail of the apparatus shown in Figure 7B.

Referring to the drawings, perforated record cards are fed one at a time from a magazine 1, Figure 1B, by known means, not shown, and are delivered to a designation sensing device DSD. The designation sensing device is, in general, a well-known construction, as described in United Kingdom patent specification No. 371,849, and will be described herein only in so far as is necessary to the understanding of the present invention.

As is well understood, the purpose of the designation sensing device is to determine when, in a succession of cards fed to the machine, the designation of a card differs from that of the card or group of cards fed in succession next before it and, on sensing said card of different designation to initiate a total-taking operation of the machine.

The designation sensing device comprises sensing pins arranged in rows, each containing one pin for each data-indicating position in a vertical column of a record card.

Referring to Figure 3 each sensing pin consists of a lower part 2, an intermediate part 3, and an upper part 4, the pins being urged downwards by springs 5 and are supported by horizontal plates 6, 7, 8, 9 and 10 extending between a pair of vertical end plates 11 mounted for vertical reciprocation by eccentrics 12, Figure 4, driven by means, not shown, from the main shaft 13, Figure 1A, of the machine.

Resting on the plate 9, Figure 3, is a number of recording elements 14, all of which are identical, being formed by strips of metal provided with sensing projections 15 and locking projections 16 which extend horizontally between the intermediate parts of 3 of the sensing pins, there being one recording element 14 for each intermediate part 3. The recording elements 14 and the parts 3 are in alternate parallel rows. Between the recording elements 14 and the respective parts 3 of the sensing pins of each row, and in relation to the projections 15, 16, a locking bar 17 and a testing bar 18 are placed one under the other.

Each locking bar 17 is provided with a number of L-shaped lugs 19 which co-operate with the projections 16, namely to engage under the projections 16 of the pins in the raised position, and over projections 16 of pins in the lower position. The locking bars 17 are joined together by common rods 20 and can be reciprocated horizontally by bell-cranks 21 pivoted at 22 to the end plates 11 and rockable in known manner by cross members 23 connected to plate 9 for vertical reciprocation therewith.

Each testing bar 18 is provided with a number of vertical slots 24 which co-operate with the projections 15. The bars 18 slide horizontally on guides 25 and each carries a pin 26 engaging in the depending arm 27 of a bell crank pivoted on a shaft 28.

The intermediate parts 3 of the sensing pins are provided with recesses 29 which receive the projections 15 when the testing bars 18 are moved to the right as viewed in Figure 3.

When a batch of cards is being passed through the machine a record is taken in the machine of the first card of the batch, and this record represents exactly the arrangement of the perforations forming the designating group in the card. This record is checked by the machine each time a card passes through it, by a testing arm 30, Figure 4, co-operating with the test bars 18 as explained below. If this testing mechanism detects a change of designation the card feed mechanism is arrested and the pin box incorporating the sensing pins 2, 3, 4 ceases to operate, being then in the lowermost, or sensing position, thereof. After a batch of cards has passed through the machine the record is again taken and is retained in the mechanism throughout the normal action of the machine.

The manner in which a record is taken by the machine will now be described, assuming that no card is in the machine and that a batch of cards is about to pass through. When the first card of the batch reaches the designation pin box the total-taking mechanism will be set since a change in designation will have occurred, that is from no card at all to the designation on the first card of the batch which is now being sensed by the designation pin box.

When the designation pin box is lowered by the eccentrics 12 all those sensing pins in the box which are not in positions corresponding to perforations in the card are raised by the card, the remainder of the pins passing through the perforations forming the designation group of the card. The testing bars 18 then move across and make a test.

As this is a change from no card to a card, a change of designation is sensed and an operation in the machine is automatically initiated, the total-initiating shaft 31, Fig. 1B being caused to rotate and a total taken, this total being zero. At this time, and in known manner form-ing no part of the present invention, the pin box remains in the down, or sensing, position thereof and the card feed mechanism is temporarily arrested.

On rotation of the shaft 31 the cross members 23 are lifted by means not shown and, in turn, raise the re-setting plates 9. Raising of members 23 also causes the locking bars 17 to be moved to the right, as viewed in Fig. 3, thus unlocking the recording elements 14.

As the re-setting plates 9 are raised they engage shoulders on the intermediate pin parts 3 thus raising all the parts 3 together with the recording elements 14 until all the sensing projections 15 are in line with the recesses 29 of the parts 3 and the locking projections 16 are above the lugs 19 on the locking bars 17 so permitting springs 32, Fig. 3, to bring the testing bars 18 across from left to right as viewed in Fig. 3, thereby moving the projections 15 on the recording elements into the recesses 29 in the testing bars 18 and tilting the recording elements 14 about their lower ends.

Movement of the re-setting plates 9 is so timed that the recording elements 14 are unlocked before the parts 3 are raised and the testing bars 18 move across the pin box to bring the projections 15 into the recesses 29. The re-setting plates 9 are then lowered and those pins which have no corresponding perforation in the card will remain up and consequently their recording elements 14 will be held up with them, the projections 15 of the recording elements still being in the recesses 29. The remaining pins descend through perforations in the card and the corresponding recording elements follow their movement.

The bell cranks 21 return the locking bars 17 so that the pins are locked in their respective positions, up or down as the case may be. The pin box is now raised and bars 33, 34 Figs. 3 and 4, in known manner, return the testing bars 18 across the pin box from right to left, as viewed in Fig. 3 thus tilting the recording elements 14 back to the vertical positions thereof and bringing the sensing projections 15 out of the recesses 29 and permitting the pins to descend. Since, however, the recording elements 14 are locked by the L-shaped lugs 19 on the locking bars 17 in the position in which they have been set, these recording elements constitute a mechanical record of the grouping of the perforations in the card.

It should be observed that the sensing and locking action takes place during approximately two revolutions of the main shaft 13, Fig. 1A, and only during a total-taking operation, and that when the next card in the group passes through the machine, the total-initiating shaft 31 remains stationary, provided that the following card bears the same arrangement of designation perforations as the previous one.

As previously mentioned, each testing bar 18 carries a pin 26 engaging in a slot in the depending arm 27 of a bell-crank pivoted on the shaft 28, Fig. 3. The other arm 35 of the bell-crank carries a pin 36 normally disposed beneath the lever 37 to hold it up in the normal position against a guide stop 38. One end of the lever 37 carries teeth 39 which are maintained in engagement with laterally projecting pins 40 on a wheel 41 by a guide rod 42 which also acts as a fulcrum for the lever 37, the wheel 41 being freely rotatable about a fixed shaft 43. Each wheel 41 is provided with a number of notches 44 and with an operating handle 45, and arranged to engage with the notches 44 is a spring-loaded detent 46.

Each lever 37 carries a square tooth 47 which can be selectively positioned under one of three bars 48, 49, 50 by rotating its wheel 41 thus moving the lever lengthwise. The bars 48, 49, 50 are disposed lengthwise of the pin box, Figs. 2A, 2B, and 4, at right angles to the testing bars 18 and are connected at one end to Y-arms 51, 52, 53 Fig. 1B, of which the arms 52, 53 are pivoted on one side of a pair of end plates 54 while the arm 51 is pivoted on a bracket to be described below. The opposite ends of the bars 48, 49, 50 are connected to further Y-arms 55, 56, 57, Fig. 4, of which the Y-arm 55 for bar 48 is shown in Fig. 2B in the position which it occupies to initiate a total-taking operation.

The Y-arms 51, 55, hereinafter referred to respectively as the second and the first Y-arms, 52, 56 and 53, 57, are also connected by links 58, 59, 60 which are parallel to bars 48, 49, 50 to form therewith, and with the Y-arms, a parallel link mechanism.

The links 58, 59, 60 are provided with springs 61, Figs. 2A and 5, which tend always to draw the links in a direction from right to left, as viewed in Figs. 2A, and 2B, thereby normally holding the bars 48, 49, 50 in the lowest position thereof, that is with the tails of Y-arms 55, 56, 57 swung outwards to the right as viewed in Fig. 2B.

The bar 48 is provided for the purpose of controlling sub-totals, the bar 49 to control both accumulative totals and sub-totals, and the bar 50 to control grand-totals, accumulative-totals, and sub-totals and the bars 48, 49, 50 will hereinafter be referred to respectively as a sub-total-initiating member or as the sub-total bar, the accumulative-total-bar, and the grand-total-bar.

If one of the levers 37 is moved so that its tooth 47 lies under the sub-total bar 48, then the machine will be set to take a sub-total at the end of a group of cards of all the items appearing on the cards of that one group. This is effected by the downwardly projecting tail of the first Y-arm 55 as described below.

If the tooth 47 of any of the levers 37 is placed under the grand-total bar 50, a grand-total of all of the sub-totals of individual groups constituting a batch of cards is taken when a change in designation indicating a change in batch occurs, the grand-total or accumulative total being a total of all the sub-totals which have been taken since the preceding batch change, and also sub-total or an accumulative total will be taken at the end of the batch of cards as before, of all items on the cards which have passed through the machine since the last sub-total or accumulative total was taken.

Finally, if the tooth 47 of any of the levers 37 is brought beneath the accumulative total bar 49, two totals will be simultaneously taken at the end of a pack of cards, namely, an accumulative total and a sub-total.

Considering the operation of the apparatus in the case when a sub-total only is to be taken, the wheel 41 corresponding to the column on which the sub-total is to be taken is turned until the tooth 47 on the corresponding lever 37 lies beneath the sub-total bar 48, the machine is then set in operation and the designation pin box descends to take a record as described above, this record being retained until the pin box senses a change of designation. On sensing of a change of designation all the testing bars 18 remain stationary, so also do the bell cranks 27 and consequently the pin 36 will hold up the lever 37 which in turn, by means of the tooth 47, will hold up the sub-total bar 48. Consequently, the depending tails of the Y-arms 51, 55 will not be rocked counter-clockwise to the substantially vertical position shown in Figs. 2A and 2B.

When the tail of the first arm 55 is in its vertical position it is engaged in a notch 62, Fig. 4, in a total-initiating bar 63. Similarly, when in their vertical position the tails of the Y-arms 56, 57 are engaged in notches 64, 65 in the bar 63. The bar 63 is guided by a pin and slot connection 66 and is pivoted at the other end 67 to the lever 30. The lever 30 is connected at its lower end to a shorter lever 68 carrying a roller 69 bearing on a cam 70 mounted on a shaft 71, Fig. 4. A spring 72, Fig. 4, attached to bar 63 tends to pull the bar to the right as viewed in Fig. 4 thus maintaining contact between roller 69 and cam 70.

As long as the cards passing through the machine all bear the same designation all the bars 48, 49, 50 will be permitted to remain in the lowermost positions thereof due to the teeth 47 being in the lower positions thereof as the result of the rocking of bell cranks 27. Consequently the tails of the Y-arms 55, 56, 57 will all be rocked and swung out of the vertical position so that they are disengaged from the notches 62, 64, 65 in the total-initiating bar 63 thus permitting the total-initiating bar to move across the machine and allowing the levers 30, 68 to turn about their pivots so that the roller 69 follows cam 70.

Thus when the roller 69 drops into the recess in cam 70, the projection 73, Fig. 4, on lever 68 presses a finger, not shown, so that the mechanism, also not shown, by which the total-initiating shaft 31 is coupled to the main shaft 13 for rotation thereby is rendered ineffective and the total-taking mechanism remains in the normally inactive condition thereof.

As soon, however, as the first card of the next group passes through the machine, that is a card having a different designation from that of the preceding cards, the testing bars 18 will be unable to move to the right, as viewed in Fig. 3, the sub-total bar 48 will be held up by its tooth 47 so that the tail of the first Y-arm 55 remains in notch 62, and roller 69 will be prevented from following the contour of cam 70. Thus projection 73 will not be operated to render the total-initiating shaft 31 inactive and a total-taking operation will ensue.

It will be understood that the total-taking operation just described tends to effect all the total units of the machine and would produce a sub-total, a grand-total, and an accumulative total unless, as is customary and well known, this action is prevented. This known mechanism forms no part of the present invention and is not necessary to the understanding thereof and, accordingly, is not described herein.

All of the mechanism so far described is well known being similar to that described in the above mentioned specification No. 371,849, and, as the known operation of the bars 50 and 49 for taking grand-totals and accumulative-totals is not necessary to the understanding of the present invention such operation will not be described herein.

As has been mentioned above, the present invention is concerned with the provision of apparatus whereby when a batch of cards contains a single-card group the control mechanism as exemplified by the bar 48 and its co-operating Y-arms 51, 53 is rendered ineffective, the control mechanism continuing to be rendered ineffective until the designation sensing device described above senses two successive cards of like designation. The mechanism according to the present invention will now be described in relation to the mechanism described above and with particular reference to Figs. 1A, 1B, 2A, 2B, 5, 6, 7A, 7B and 8 of the drawings.

The mechanism according to the present invention comprises a normally inactive interrupter device consisting of a two revolution clutch comprising a driving gear 74, Fig. 1B, pivoted on a fixed delay shaft 75 continuously rotated from the main shaft 13 by gearing, not shown in Figs. 1A, and 1B, in a manner such that the gear 74 makes one revolution for each two revolutions of the main shaft 13. The gear 74 carries two clutch pawls 76 which are freely mounted on pivot pins 77 secured to the gear and urged by springs to the operative positions thereof at which the nose 78 of a pawl can be engaged with the step 79 of a clutch dog 80 secured to a delay cam 81, the dog 80 and cam 81 being freely rotatable about shaft 75 and retained in one or other of two predetermined positions thereof by co-operation between one or other of two pins 82, carried by the cam 81, and a detent arm 83 pivoted at 84 and urged by a spring 85 towards the path of the pins 82.

During the normal operation of the machine, that is when a succession of cards of like designation is being passed therethrough, one of the pawls 76 is retained in the tripped position thereof, as shown in Fig. 1B by a trip lever 86 freely pivoted on a spindle 87 and connected with a trip arm 88 also pivoted on the spindle 87. Connection between lever 86 and arm 88 is effected by a pin 89 carried by arm 86 to extend into a slot 90 in lever 88. A spring 91 acts normally to maintain the pin 89 engaged with the top of slot 90.

The trip arm 88 has an over turned portion 92 for co-operation with the peripheral contour of a trip cam 93 secured to the total-taking shaft 31 for rotation therewith. Thus when a total-taking operation is initiated by lever 30, as described above, the total-initating shaft 31 rotates, counterclockwise as viewed in Fig. 1B, and cam 93 turns arm 88 clockwise, as viewed in Fig. 1B, to raise lever 86 out of tripping engagement with the pawl 76. On being released by lever 86, the nose 78 of the pawl engages step 79 of dog 80 and gear 74 causes counterclockwise movement of both dog 80 and delay cam 81 thus bringing the raised contour 94, Fig. 1B, of the delay cam into engagement with a roller 95 carried by an interrupter lever 96 pivoted on spindle 87 and causing lever 96 to be rocked clockwise about the spindle 87.

Connected to the interrupter lever 96 is an interrupter link 97 the upper end of which, through a lost-motion connection 98, 99, 100, Fig. 2A, is connected to one arm of a bell crank 101 pivoted at 102 to a bracket 103 fixed to one end plate 54. The other arm of the bell crank 101 has a slot 104 in which is located a pin 105 extending laterally from a bar 106 guided for lengthwise movement in slots formed in the end plates 54. Brackets 107, Figs. 1B, 2A, 2B, and 5, are secured to the bar 106 and support the Y-arms 51, 55 which, as described above, co-operate with the sub-total bar 48. Accordingly, it will be understood that as the grand-total bar 49 and the accumulative total bar 50 co-operate with Y-arms pivoted on the fixed frames 54, the sub-total bar 48 and its Y-arms 51, 55 are movable as a unit relative to the total-initiating bar 63, Fig. 4, and to the grand-total and accumulative total bars 49, 50 and their co-operating Y-arms. The brackets 107 are slidable on guide pins 108 secured to the end plates 54 and a spring 109, Fig. 5, urges the unit to the normal position thereof which is that shown in Figs. 2A, 2B, and 5.

Unitary movement of the sub-total bar 48 and its co-operating Y-arms 51, 55 is effected by the interrupter link 97 and bell crank 101 and when, as described above, the link 97 is lifted by cam 81 the bell-crank 101 is rocked clockwise, as viewed in Fig. 2A, thereby moving bar 106 to the right so that the Y-arms 51, 55, while maintaining their tails in the substantially vertical position thereof, the tails being in these positions because a change of designation has just been sensed, are moved to positions such that the tail of arm 55 is completely disengaged from its notch 62 in bar 63 although the tail of arm 51 remains in alignment with a sensing finger 209, Figs. 1B and 2A. The sub-total bar 48 and its Y-arms 51, 55 are moved to the right-ward position thereof as just described before the sensing of the card next succeeding that which initiated the total-taking operation and so if when said next succeeding card is sensed by the designation sensing device it is found to be of different designation from the preceding card the normal control exercised by the unit to initiate a total-taking operation cannot be effected because there is no co-operation between the tail of Y-arm 55 and the total-initiating bar 63.

The sensing finger 209 is pivoted on a pin 110, Fig. 1B, carried by an operating link 111 which is connected at its lower end to an arm 112, Figs. 1B, 2A and 6, freely mounted on a rock shaft 113 and connected to the strap 114, Fig. 6, of an eccentric 115 rotatable with shaft 71. The shaft 71 is driven in 1:1 relation with the main shaft 13 and accordingly by the link 111 is raised once during each revolution of the main shaft 13. The link 111 has a slot 116, Fig. 1B, which embraces a fixed pin 117 to guide the link during the up and down movement thereof.

The sensing finger, 209 is also pivotally connected to the upper end of a trip link 118 the lower end of the link being connected to an arm 119 secured to a rockable trip shaft 120, Figs. 1B and 2A. When the operating link 111 raises the sensing finger 209 the free end of the finger, if the tail of Y-arm 51 is in the vertical position thereof, engages the tail of the Y-arm 51 and the finger pivots counterclockwise on the pin 110 so that the trip link 118 is raised and rocks the trip shaft 120 clockwise as viewed in Fig. 1B. Also secured to the trip shaft 120 is a trip lever 121 urged by a spring 122 to the normally inactive position thereof shown in Fig. 1B. On clockwise movement of the trip shaft 120 the trip lever 121 is raised into the path of the pawl 76 which, as described above, has been released as the result of the operation of the total-taking shaft 31, thus tripping the pawl out of engagement with the dog 80 so that rotation of the dog 80 and cam 81 is interrupted and the detent arm 83 is engaged with the pin 82 opposite that with which it is engaged in Fig. 1B. The cam 81 has, therefore, at this time completed only one-half of a revolution, the roller 95 is still engaged with the high part 94 of the cam 81, and the sub-total bar with its co-operating Y-arms 51, 55 remains in the position to which it is moved by the interrupter link 97. However, if the next card sensed by the designation sensing device DSD is a card of different designation from that of the card which initiated the total-taking operation and caused the movement of bars 48, 58 and arms 51, 55 to the right as just described, on raising of the operating link 111 the sensing finger 209 will cause the trip link 118 again to be raised so that the trip lever 121 is raised to trip the pawl 76 advancing towards it with the result that the cam 81 remains stationary and retains the interrupter link 97 in the raised position thereof. This occurs every time should a succession of single-card groups be fed to the designation sensing device.

Should the card next fed to the designation sensing device after the card which initiates a total-taking operation be a card having the same designation as that of the card which initiated the total-taking operation the sub-total bar 48 will remain in the lower position thereof and the Y-arms 51, 52 will be swung to positions counterclockwise to those which they occupy in Figs. 2A and 2B so that the tail of Y-arm 51 will be out of alignment with the sensing finger 209. Accordingly, when the link 111 is raised it will not engage the tail of Y-arm 51 and link 118 will not be raised. Since link 118 is not raised a pawl 76 will engage step 79 on dog 80 and will move the cam 81 angularly through 180° until the driving pawl is tripped by the first trip lever 86 when the cam will again be detented in the position shown in Fig. 1B and link 97 will be lowered permitting spring 109 to restore bars 48, 58 and Y-arms 51, 55 to the normal positions thereof, in which positions they will remain until the designation sensing device again senses a change of designation to initiate a further total-taking operation of the cam 93.

Thus it will be understood that the mechanism just described ensures that when a total-taking operation has been initiated no further total-taking operation will be initiated until the designation sensing device senses that at least two successive cards delivered thereto are of like designation.

The apparatus above described is illustrated as fitted to a record card controlled tabulating machine which, as is customary, incorporates a sub-total accumulator, not shown, into which amounts sensed from cards are added, and a grand-total accumulator to which amounts registered in the sub-total accumulator are transferred during a normal sub-total-taking operation following which the sub-total accumulator is cleared or zeroised. Such mechanisms are well known in the art and form no part of the present invention but in Figs. 7A and 7B is diagrammatically illustrated to part of one such mechanism.

In the mechanism diagrammatically illustrated in Figs. 7A and 7B a printed record of an item sensed from a card, or of a total, is effected in known manner by type-carrying sectors 123, Fig. 7A, which co-operate with a platen 124. During normal adding operations amounts are added into sub-total accumulators, not shown, during operation of the sectors 123 the extent of clockwise movement of which, as viewed in Fig. 7A, is determined by stops 125 settable by means, not shown, controlled by a card sensing device, also not shown, to which a card is delivered after ejection from the designation sensing device DSD. During a sub-total-taking operation the amount read-out from the sub-total accumulator is transferred to a grand-total accumulator, indicated diagrammatically at GTA, Fig. 7A, by toothed elements 126 movable with the sectors 123.

A sub-total-taking operation effected by a normally inoperative rock shaft 127, Fig. 7A, hereinafter referred to as the back-total shaft, and a grand-total-taking operation is effected by a normally inoperative rock shaft 128, hereinafter referred to as the front-total-shaft. When, however, a single card group is sensed by the designation sensing device DSD, thus requiring that the machine take what will hereinafter be referred to as a "special total," to save machine time and wear it is desired that the amount sensed from the "single" card be not added into the sub-total accumulator which, because the preceding card initiated a normal total-taking operation, will be registering zero, but be entered directly into the grand-total accumulator. To achieve this result the apparatus according to the present invention provides means whereby on the sensing of a single-card group a drive shaft 136, referred to below, is rendered ineffective to operate the sub-total accumulator.

The mechanism for rendering the shaft 136 ineffective on sensing of a single card group comprises a sub-total interrupter link 129, Figs. 1A and 7A, having its lower end pivotally connected to the interrupter lever 96 and its upper end connected to a lever 130 secured to a rock shaft 131, Fig. 7B. Also secured to the shaft 131 is an arm 132 connected to a cam plate 133, Figs. 7B and 8, which is provided with slots 134, 135 respectively to engage the front-total shaft 127 and a rockable drive shaft 136 for sliding movement relative thereto. Freely mounted on the drive shaft 136 is a drive arm 137 to which is connected an operating member 138 to control the sub-total accumulator. The drive arm 137 carries a latching block 139 arranged to be engaged by a latch 140 carried on a pivot pin 141 extending from a coupling block 142 secured to drive shaft 136 and urged by a spring 143 into latching engagement with the latching block 139.

When the interrupter lever 96 is raised it raises the sub-total interrupter link 129 thus rocking shaft 131 counterclockwise, as viewed in Fig. 7B, and moving cam plate 133 lengthwise to the right, as viewed in Fig. 7B. This movement of the cam plate, by engagement with the spring post 144 carried by the latch, causes the latch to be disengaged from the latch block 139 and renders the operating member 138 ineffective so that when the special total is taken no amount is registered by the sub-total accumulator.

During a special total-taking operation although no amount is registered in the sub-total accumulator the amount sensed from the card which initiates the special total-taking operation must be registered in the grand-total accumulator in order that when a grand-total is taken such total is a total of all of the groups of cards passed through the machine subsequent to the taking of the preceding grand-total, irrespective of whether such groups each contain a plurality of cards or whether the groups consist of single-card groups or a mixture of single- and multi-card groups.

To permit the amount sensed from the card of a single-card group to be registered directly into the grand-total accumulator there is provided the mechanism about to be described.

The front-total shaft 128 is rocked in the usual manner by a total-taking link 145, Figs. 7A and 2B, the upper end of which is connected to an arm 146 secured to the shaft 128. The lower end of link 145 is connected to an arm 147, Figs. 1A and 2B, secured to a rock shaft 148. Also secured to shaft 148, to be located in front of arm 147 as viewed in Fig. 1A, is an auxiliary arm 149 having a lateral projection 150 which normally is located in the upper portion of a window 151, as shown in Fig. 7A, formed in a latch plate 152 secured to a latching lever 153 pivoted at 154 to one arm of a bell-crank 155 which is pivoted at 156. The other arm of the bell-crank 155 carries a cam follower 157 urged by a spring 158 into engagement with a cam 159 secured to the main shaft 13.

The latching lever 153 is disposed beneath a pin 160 carried by a latch-conditioning lever 161, 162 of which the two parts are displaced axially of and are each secured to a shaft 163. The lever arm 161, Fig. 1A, is engaged by a pin 164 on the interrupter link 129. A spring 165 causes lever 161 to be turned counter-clockwise as viewed in Fig. 1A, when link 129 is raised and this movement of lever 161, through engagement of pin 160 with lever 153, rocks lever 153 about its pivot 154 so that the window 151 is raised relative to the latch block 150 and the block 150 is then located in the lower portion of the window. On rocking of bell-crank 155 by cam 159, with block 150 in the lower part of the window, the auxiliary arm 149 rocks shaft 148 and pulls link 145 downwards to effect rocking of the front-total shaft 128 thereby to control co-operation of the grand-total accumulator with the toothed member 126 so that the amount sensed from the card which initiated the special total-taking operation is registered in the grand-total accumulator.

Normal operation of the shaft 148 by arm 147 is effected in a manner similar to that just described, there being, as is customary, a latching block 150a Fig. 2B, similar to block 150, on the arm 147, such other latching block co-operating with a windowed latch plate, not shown but similar to plate 152, carried by a pivoted latching lever, also not shown but similar to lever 153 and operated in known manner to permit operative connection between the latching block on arm 147 and its co-operating windowed latch plate. The arm 147, as is customary, is retained in the "down" position thereof, to which it is moved by the usual box-cam 166 secured to the main shaft 13, by the known latch 167 pivoted at 168 and co-operating with a block 169 on arm 147. A spring 170 urges the latch 167 into latching relation with block 169 and the usual trip element 171 carried by cam 166 is operative to engage the tail 172 of the latch to disengage it from block 169.

When a normal total-taking operation is a grand-total-taking operation, operation of the delay cam 81 will be initiated because, as described above, this occurs whenever the total-initiating shaft 31 is operated. However, shaft 31 revolves twice when the total-taking operation is a grand-total-taking operation and it is therefore necessary to render the trip lever 86 ineffective during the first of the two revolutions of the shaft 31. To render trip lever 86 ineffective in the circumstances just mentioned a trip lever latch 173, Fig. 1B, is secured to the rock shaft 113 which, by mechanism not shown, is rocked, counterclockwise as viewed in Fig. 1B, during the early part of the first revolution of shaft 31 to cause the latch 173 to engage the pin 89 on trip lever 86 thereby restraining the lever 86 against being raised by trip arm 88. This restraint is absorbed by spring 91 and latch 173 is restored to its inactive position before the cam 93 operates the arm 88 during the second revolution of the cam.

As is well understood in the art, in a tabulating machine having a head as briefly described above with reference to Figs. 7A and 7B the front-total shaft 128 is coupled to the back-total shaft by the usual arm 174, Fig. 7A, secured to the front-total shaft 128, a link 175 and an arm 176 secured to the back-total shaft 127. The back-total shaft 127 has freely mounted thereon a block 177 having a cam face 178 formed thereon to engage with a projection 179 on a plate 180 which normally retains the nought hutters 181 of the tabulator in a position in which they engage the heels 182 of the sectors 123. As is customary, the nought shutters are rendered inactive by means, not shown, on the setting-up of any of the stops 125. When the front-total shaft 128 is rocked the back-total shaft 127 is also rocked, but in a counterclockwise direction, as viewed in Fig. 7B, and the cam face 178 engages with the projection 179 and thereby moves the plate 180 so as to release the nought shutters 181 and allow the sectors 123 to move forwards, that is clockwise as viewed in Fig. 7A. However, during a "special" total-taking operation it is required to permit forward movement only of those sectors corresponding to columns of stops 125 in which a selection of stops has been effected, the other sectors being retained by their nought shutters in the restored condition thereof and the mechanism according to the present invention includes means to render the block 177 ineffective during a "special" total-taking operation.

The means whereby the block 177 is rendered ineffective comprises a shutter-controlling latching block 183, Fig. 7B, similar to block 139 described above, which normally is engaged by a shutter-controlling latch 184 on a pivot pin 185 carried by a shutter-controlling coupling block 186 secured to shaft 127 and urged to the latching position thereof by a spring 187. A second cam face 188 on the cam plate 133 engages a delatching pin 189 on latch 184, said pin 188 being a post for spring 187, and on movement of the cam plate 133 by the interrupter link 129 the block 177 is uncoupled from back-total shaft 127 so that on rocking thereof the block 177 is rendered ineffective and does not release the nought shutters 181 on rocking of back-total shaft 127 by front-total shaft 128 and link 175.

Should it be desired to render the special total-taking mechanism inoperative this may be done by a cut-out lever 190, Fig. 1B, freely pivoted on the rocking spindle 87 and having a tail piece 191 which, when the lever 190 is detented in the notch 192 of a fixed plate 193, is engaged with the pin 89 to prevent operation of the trip lever 86 by trip arm 88.

In the foregoing description apparatus according to the present invention has been described as applied to one particular kind of tabulating machine, it will, however, be understood that such apparatus can be applied to other forms of tabulating machine, or to card-controlled adding machines other than tabulating machines, and that the constructional details may be modified for accommodation in such other machines always provided that the machine embodies a normally inactive total-taking mechanism, a designation sensing device operative to sense changes of designation of cards fed in succession thereto, a control mechanism operative by the designation sensing device on sensing thereby of a change of designation to render active the total-taking mechanism and, in accordance with the present invention, has incorporated therein a normally inactive interrupter device to render the control mechanism ineffective to effect activation of the total-taking mechanism, and a normally inactive delay device rendered active by an operation of the total-taking mechanism to effect actuation of the interrupter device and to maintain the interrupter device in the actuated condition thereof until determination by the designation sensing device of the feeding thereto of two successive cards of like designation. Thus in one alternative form of tabulating machine, the members 48, 49, 50 may consist of pivoted shutters controlled by the designation sensing device and a sensing member similar to the member 209 described herein may co-operate with the shutter which performs the function of the member 48 described herein. Further, if desired, the delay shaft 75 may be rotatable and one of the clutch parts, e. g. the driving part, secured thereto. Also, if desired, the clutch dog may comprise two steps, similar to step 79, for co-operation with a single pawl 76 on the driving clutch part.

I claim:

1. A record card controlled adding machine comprising normally inactive total-taking mechanism, a designation sensing device operative to sense changes of designation of cards fed in succession thereto, and control mechanism operative by the designation sensing device on sensing thereby of a change of designation to render active the total-taking mechanism, characterised by a normally inactive interrupter device to render said control mechanism ineffective to effect activation of the total-taking mechanism, and a normally inactive delay device rendered active by an operation of the total-taking mechanism to effect actuation of the interrupter device and to maintain the interrupter device in the actuated condition thereof until determination by the designation sensing device of the feeding thereto of two successive cards of like designation.

2. A machine according to claim 1, wherein the delay device comprises a rotatable clutch including a driving part and a driven part, trip means normally operative to render the clutch inactive, and actuating means operable by an operation of the total-taking mechanism to render the trip means inactive to permit co-operation between said driving and driven clutch parts.

3. A machine according to claim 2, wherein the clutch includes at least one pawl carried by one of said clutch parts for co-operation with the other of the clutch parts, said trip means being operative normally to prevent active co-operation between said pawl and other clutch part.

4. A machine according to claim 3, wherein the driving part comprises a driving gear continuously rotatable about a fixed delay shaft, and a pair of equi-spaced pawls pivotally mounted on the driving gear for co-operation with the clutch dog.

5. A machine according to claim 4, wherein the total-taking mechanism includes a rotatable total-initiating shaft and the trip means comprises a trip lever disposed normally to prevent co-operation between a pawl and the clutch dog thereby to prevent angular movement of the clutch dog, a trip arm co-operative with the trip lever to effect movement thereof from its normal active position, and a trip cam rotatable in timed relation with the total-initiating shaft to effect operation of the trip arm.

6. A machine according to claim 5, including a spindle on which the trip lever and the trip arm are freely mounted, a pin extending laterally from said trip lever into a slot in the trip arm to effect operative co-operation between the trip arm and trip lever, and a spring connecting said pin and trip arm.

7. A machine according to claim 6, including a cut-out lever freely mounted on said spindle, a detent plate to retain the cut-out lever either in the active or the inactive position thereof, and a tail-piece movable with the cut-out lever and operative in the active position of the cut-out lever to engage said pin on the trip lever to prevent movement of the trip lever from the normal pawl tripping position thereof.

8. A machine according to claim 7, wherein the control mechanism includes a sub-total-initiating member controllable by the designation sensing device, and wherein said interrupting means is connected with the tub-total-initiating member.

9. A machine according to claim 8, wherein the control mechanism includes a notched total-initiating bar, and said sub-total-initiating member comprises a first rockable Y-arm having a tail for normal co-operation with a notch of said notched bar, a second rockable Y-arm having a tail movable therewith, a pair of parallel bars connecting said Y-arms for simultaneous rocking movement under control of the designation sensing device thereby to disengage the tail of the first Y-arm from co-operation with the notched bar, supporting means for said Y-arms and parallel bars to permit movement thereof as a unit thereby to move the tail of said first Y-arm into and out of co-operation with said notched bar without rocking movement of the Y-arms, said interrupter device being connected with said supporting means to control said unitary movement of the Y-arms and parallel bars.

10. A record card controlled adding machine comprising normally inactive total-taking mechanism, a designation sensing device operative to sense changes of designation of cards fed in succession thereto, control mechanism operative by the designation sensing device on sensing thereby of a change of designation to render active the total-taking mechanism and including a sub-total-initiating member controllable by the designation sensing device, characterised by a rotatable clutch including a driving part and a driven part, trip means normally operative to render the clutch inactive, actuating means operable by an operation of the total-taking mechanism to render the trip means inactive to permit co-operation between said driving and driven clutch parts, a delay cam movable angularly with the driven clutch part, an interrupter lever operable by the delay cam, and linkage connecting the interrupter lever and sub-total-initiating member.

11. A machine according to claim 10, including sensing means to co-operate with the sub-total-initiating member, a normally inactive trip lever operable when active to render the driven clutch part inactive, and a trip device actuated by the sensing means to render the trip lever active.

12. A record card controlled adding machine, comprising a normally inactive rotatable total-taking shaft, a designation sensing device operative to sense changes of designation of cards fed in succession thereto, a normally active notched total-initiating bar to initiate operation of said total-taking shaft, a sub-total-initiating member for actuation by the designation sensing device on the sensing thereby of a change of designation to render the total-initiating bar inactive, supporting means operative normally to support the sub-total-initiating member for co-operation with the total-initiating bar and movable relative to the bar to permit movement of the sub-total-initiating member relative to the bar to a position at which co-operation between said member and bar is prevented, a normally inactive interrupter device connected with said supporting means to effect said relative movement, and a normally inactive delay device connected with said interrupter device and rendered active by operation of said total-taking shaft to effect actuation of the interrupter device and to maintain it in the actuated condition hereof until the determination by the designation sensing device of the feeding thereto of two successive cards of like designation.

13. A machine according to claim 12, wherein the sub-total-initiating member comprises a first rockable Y-arm having a tail for normal co-operation with a notch of said total-initiating bar, a second rockable Y-arm having a tail movable therewith, said Y-arms each being rockable on said supporting means, and a pair of parallel bars connecting said Y-arms for simultaneous rocking movement under control of the designation sensing device thereby to disengage the tail of said first Y-arm from co-operation with the notched bar.

14. A machine according to claim 13, wherein the delay device comprises a rotatable clutch including a driving part and a driven part, trip means normally operative to render the clutch inactive, and actuating means operable under control from said total-taking shaft to render the trip means inactive to permit co-operation between said driving and driven clutch parts.

15. A machine according to claim 14, wherein the interrupter device comprises a delay cam movable angularly with the driven clutch part, an interrupter lever operable by the delay cam, and linkage connecting the interrupter lever and said supporting means.

16. A machine according to claim 15, including sensing means to co-operate with the tail of the second Y-arm, a normally inactive trip lever operable when active to render the driven clutch part inactive, and a trip device actuated by the sensing means to render said trip lever active.

17. A machine according to claim 15, including a rockable back-total shaft, a rocking drive shaft to control the taking of a sub-total, a drive arm carried by the drive shaft to be rocked therewith, a grand-total accumulator, toothed elements by which a sub-total is transferable to the grand-total accumulator, a card-controlled stop basket to control movements of the toothed elements at times other than during a total-taking operation, a rockable front-total shaft, a link connecting the back total-shaft with the front-total shaft for rocking movement therewith, a normally inoperative total-taking link to effect operation of the front-total shaft to effect rocking thereof during a total-taking operation, a link-operating shaft to effect operation of the total-taking link, sub-total interrupter means to render said back-total shaft inactive during operation of the delay cam, and auxiliary operating means operable during operation of the delay cam to actuate the total-taking link thereby to rock the front-total shaft and permit an amount sensed from a card to be registered directly into the grand-total accumulator.

18. A machine according to claim 16, wherein the sensing means comprises an operating link supported for lengthwise movement during each operation of the designation sensing device, and a sensing finger pivoted between the ends thereof to said operating link and having one end disposed for co-operation with the tail of said second Y-arm, and wherein the trip means comprises a rockable trip shaft to which the trip lever is secured for rocking movement therewith, and a trip link connected at one end to the end of the sensing finger remote from the end thereof disposed for co-operation with the tail of the second Y-arm and at its opposite end connected with the trip shaft to effect rocking thereof when the sensing finger is engaged with the tail of the second Y-arm during lengthwise movement of the trip link.

19. A machine according to claim 18, wherein said clutch driving part comprises a driving gear continuously rotatable about a fixed delay shaft, and a pair of equi-spaced pawls pivotally mounted on the driving gear for co-operation with a clutch dog forming said clutch driven part.

20. A machine according to claim 19, wherein said trip means comprises a trip lever disposed normally to prevent co-operation between a pawl and the clutch dog thereby to prevent angular movement of the clutch dog, a trip arm co-operative with the trip lever to effect movement thereof from its normal active position, and a trip cam rotatable in timed relation with the total-initiating shaft to effect operation of the trip arm.

21. A machine according to claim 20, including a spindle on which the trip lever and the trip arm are freely mounted, a pin extending laterally from said trip lever into a slot in the trip arm to effect operative co-operation between the trip arm and trip lever, and a spring connecting said pin and trip arm.

22. A machine according to claim 21, including a cut-out lever freely mounted on said spindle, a detent plate to retain the cut-out lever either in the active or the inactive position thereof, and a tail-piece movable with the cut-out lever and operative in the active position of the cut-out lever to engage said pin on the trip lever to prevent movement of the trip lever from the normal pawl tripping position thereof.

23. A machine according to claim 22, including an operating member, a normally operative coupling connecting the rocking drive shaft and operating member, and an interrupter link operable by said interrupter lever to render said coupling inactive.

24. A machine according to claim 17, wherein the coupling comprises a drive arm freely mounted on the drive shaft and connected to said operating member, a latching block carried by the drive arm, a coupling block secured to the drive shaft, a latch pivotally mounted on said coupling block and spring-urged into latching-relation with the latching block, a pin carried by the latch, and a cam plate operable by said interrupter link and co-operating with said pin to disengage the latch from latching-relation with the latching block.

25. A machine according to claim 17, in which the total-initiating shaft is rotated for two revolutions during a grand-total-taking operation and including a rock shaft rockable during the first of said two revolutions of the total-initiating shaft, a pin and slot connection between said trip lever and trip arm, a spring acting to maintain normal co-operation between the trip arm and trip lever, and a latch carried by said rock shaft to engage said pin and restrain the trip arm against actuation thereof by the trip lever during the first of said two revolutions of the total-initiating shaft.

26. A machine according to claim 24, wherein the auxiliary operating means comprises an auxiliary arm secured to the link-operating shaft, a projection extending laterally from the auxiliary arm, a latching lever having a window in the upper portion of which said projection is normally located to be inactive to effect rocking of the auxiliary arm, a bell-crank to which the latching lever is pivoted, a rotatable cam to rock said bell-crank, and a pivoted latch-conditioning lever operable by said interrupter link to rock the latching lever thereby to locate the projection in the lower portion of said window to permit rocking of the auxiliary arm by the rotatable cam.

27. A machine according to claim 24, including swingable type-carrying sectors, nought shutters incorporated in said stop basket to retain said sectors in the inactive positions thereof, a plate to retain the nought shutters in the active positions thereof, a cam block freely mounted on said back-total shaft, a shutter-controlling latching block carried by said cam block, a shutter-controlling coupling block secured to said back-total shaft, a spring-urged shutter-controlling latch pivotally supported by said coupling block normally to engage said latching block, a delatching pin carried by the shutter-controlling latch, and a shutter controlling cam movable with said cam plate to engage said delatching pin on operation of the cam plate by the interrupter link thereby to render the cam block inoperative to release the nought shutters from the active positions thereof.

No references cited.